United States Patent
Ying

(10) Patent No.: US 8,195,232 B2
(45) Date of Patent: *Jun. 5, 2012

(54) UNIVERSAL RADIO MODULE

(75) Inventor: Wen-Ping Ying, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 240 days.

This patent is subject to a terminal disclaimer.

(21) Appl. No.: 12/626,163

(22) Filed: Nov. 25, 2009

(65) Prior Publication Data

US 2010/0069113 A1    Mar. 18, 2010

Related U.S. Application Data

(63) Continuation of application No. 11/449,456, filed on Jun. 7, 2006, now Pat. No. 7,627,344.

(51) Int. Cl.
*H04B 1/38* (2006.01)

(52) U.S. Cl. .............. 455/557; 455/558; 375/222

(58) Field of Classification Search ........... 455/556.1, 455/557, 558; 375/222
See application file for complete search history.

(56) References Cited

U.S. PATENT DOCUMENTS

| | | | |
|---|---|---|---|
| 7,024,223 B1 | 4/2006 | Wietfeldt | |
| 7,052,290 B1 | 5/2006 | Thornton | |
| 7,627,344 B2 * | 12/2009 | Ying | 455/557 |
| 2005/0251609 A1 | 11/2005 | Chou et al. | |
| 2006/0233191 A1 | 10/2006 | Pirzada et al. | |
| 2007/0287407 A1 | 12/2007 | Ying | |

FOREIGN PATENT DOCUMENTS

| | | | |
|---|---|---|---|
| EP | 0783236 A1 | 7/1997 | |
| EP | 1501202 A2 | 1/2005 | |
| EP | 1507400 A1 | 2/2005 | |
| WO | WO 2007/145784 | 12/2007 | |

OTHER PUBLICATIONS

Cooper, "PCI Express Form Factors", Real Time & Embedded Computing Conference, Apr. 2005, 36 pages.
Vincent, "Highly Integrated Antenna Module Combines Radio, RF Components", Portable Design, Apr. 2005, Downloaded Aug. 24, 2006, 2 pages.
International Patent Application No. PCT/US2007/012117: International Search Report dated Dec. 10, 2007, 9 pages.
European Patent Application No. 07795142: First Office Action dated Oct. 10, 2011, 4 pages.

* cited by examiner

*Primary Examiner* — Raymond Dean
(74) *Attorney, Agent, or Firm* — Woodcock Washburn LLP

(57) ABSTRACT

A universal radio module for cellular communications devices can be plugged into any appropriately configured host device to supply the host device with cellular communication capability. The module can comprise three logical module-to-host interfaces—a voice interface, a data interface, and a management interface. The module may further comprise a Subscriber Identity Module (SIM) physical interface and/or an antenna physical interface.

20 Claims, 5 Drawing Sheets

UNIVERSAL RADIO MODULE

CROSS-REFERENCE TO RELATED APPLICATIONS

This application is a continuation of and claims priority to U.S. patent application Ser. No. 11/449,456, now U.S. Pat. No. 7,627,344, filed Jun. 7, 2006, which is incorporated herein in its entirety.

FIELD OF THE INVENTION

This invention is in the telecommunications field.

BACKGROUND

The basic building blocks of a cellular communications device such as a cellular telephone (cell phone) are generally well-known. They include an antenna, a liquid crystal display (LCD), a keypad, a microphone, a speaker, and a battery. A circuit board provides interconnection between these various components. The circuit board requires most of the engineering involved in designing and building the device. It runs device software applications and processes Input/Output (I/O) to device hardware.

Most of the engineering required in designing and building a circuit board is directed to the radio stack and call processing. Advanced engineering is needed to successfully implement the desired functions. Radio stack and call processing components must also comply with a host of externally-imposed requirements, for example regulations imposed by the Federal Communications Commission (FCC), and accepted industry standard communications protocols. Furthermore, because the radio stack and call processing are fundamental to the basic operation of a cellular communications device, it is essential that the design be both high quality and cost effective to meet demanding consumer expectations.

Pre-engineered, pluggable communications modules currently exist for laptop computers. In general, these modules are designed to communicate using the popular 802.11 Wireless Local Area Network (WLAN) communications protocols. They interface with laptop electronics using the mini Peripheral Component Interconnect (mini-PCI) or PCI Express (minicard) interfaces. Recently, new laptop centric modules employing Wireless Wide Area Network (WWAN) cellular communication protocols are becoming available. Examples of such data communications modules are the NOVATEL® model EU730, SIERRA WIRELESS® MC8765.

However, such pluggable communications modules have not been widely adopted in cellular communications devices. For example, cell phone manufacturers continue to integrate radio stack and call processing functions into the more general purpose circuit board, despite the expense of doing so. This is due, at least in part, to the unavailability of an inexpensive, pluggable universal radio module that can benefit from economies of scale in manufacturing, can successfully interface with host electronics, and can fit most desired cellular device design specifications.

SUMMARY

In consideration of the above-identified shortcomings of the art, the present invention provides a universal radio module for cellular communications devices. In one embodiment, a communications module for performing radio communications functions in a cellular communications device comprises three logical module-to-host interfaces consisting of a voice interface, a data interface, and a management interface.

The logical module-to-host interfaces may correspond to three physical interfaces. In such an embodiment, a signal distribution component can be provided for distributing voice, data, and management information among said three physical interfaces.

The logical module-to-host interfaces may alternatively be multiplexed on a single physical interface, or implemented on one or more industry standard physical interfaces such as a mini PCI physical interface, a Express Card physical interface, or a minicard physical interface.

The communications module may further comprise a Subscriber Identity Module (SIM) physical interface and/or an antenna physical interface. In one embodiment, an antenna physical interface is on a same surface of the communications module as a surface comprising the physical interface(s) corresponding to the logical module-to-host interfaces.

The communications module may be consumer-pluggable into a host device. It may also be configured to implement a third generation (3G) WWAN protocol. It can perform baseband processing functions and call processing functions in addition to radio communication (RF) functions.

In a further embodiment, the invention comprises a host cellular communications device configured to interface with a communications module, where the host cellular communications device comprises three logical host-to-module interfaces consisting of a voice interface, a data interface, and a management interface. As with the module-to-host interfaces, the logical host-to-module interfaces may correspond to three physical interfaces, or may be multiplexed on a single physical interface, where the host comprises a multiplexer component for multiplexing voice, data, and management information. Alternatively, the physical interface may be implemented as a mini PCI physical interface, a Express Card physical interface, or a minicard physical interface or other established physical interface.

The host cellular communications device may be configured such that the communications module is consumer-pluggable. An antenna physical interface to the communications module may be configured such that the antenna physical interface is on a same surface of the host cellular communications device such as the physical interfaces corresponding to the logical host-to-module interfaces.

Other advantages and features of the invention are described below.

BRIEF DESCRIPTION OF THE DRAWINGS

A universal radio module in accordance with the invention is further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with telecommunications, electronics, computing and software technologies are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

With the advent of the Third Generation Cellular Network (3G), broadband wide-area wireless connectivity in excess of one megabit per second (Mbps) is becoming a reality. Applications, such as video streaming, video conferencing, TV broadcast, and realtime gaming (low latency), on cellular communications devices will flourish as content providers begin to see the opportunity and provide contents suitable for viewing on cellular communications devices.

One factor that will affect the adoption of new technologies is the cost of the devices and service. Traditional cellular communications devices are designed and manufactured on an individual device basis. The cost to develop, integrate, and test cellular communications devices can be dramatically reduced by eliminating the need for cellular network specific radio components. A universal radio module, as described herein, can be separated from host devices so that the capability of radio access can be readily applicable to any host into which the universal radio module is placed. This lowers the cost of cellular communications device production by lowering the cost of implementing radio communications functions. A universal radio module is cheaper to produce because it may be produced in higher volume, allowing devices with a wide variety of form factors to use the same universal radio module.

Figure 1:
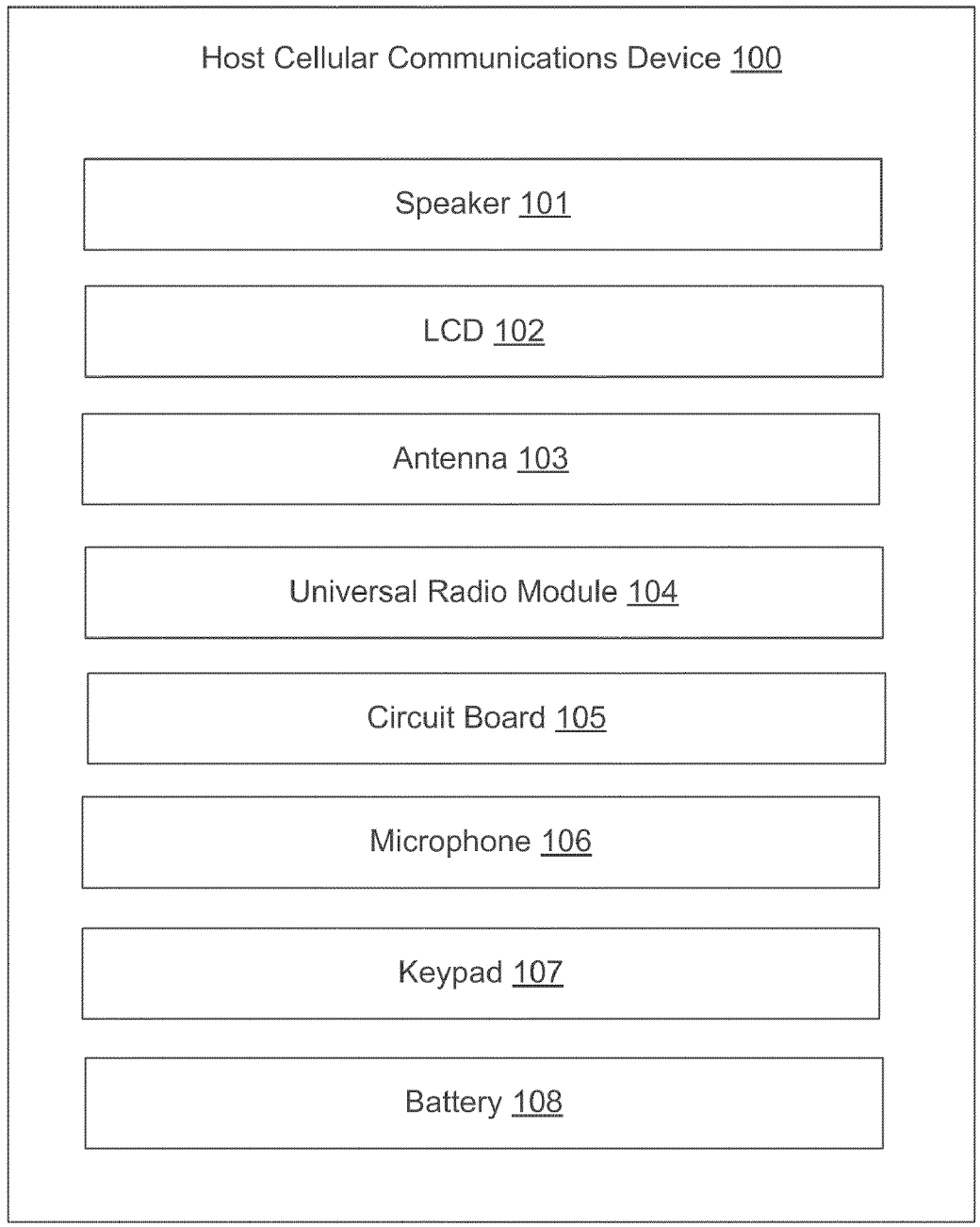
FIG. 1 illustrates a host cellular communications device 100 optionally comprising traditional components such as speaker 101, Liquid Crystal Display (LCD) 102, antenna 103, circuit board 105, microphone 106, keypad 107, and battery 108.

FIG. 1 illustrates a host cellular communications device 100 optionally comprising traditional components such as speaker 101, Liquid Crystal Display (LCD) 102, antenna 103, circuit board 105, microphone 106, keypad 107, and battery 108. Cellular communications device 100 may also comprise a universal radio module 104 according to the various embodiments described herein.

Host cellular communications device 100 may be referred to herein as host or host device. Such a host device 100 may be a cell phone or any other device that communicates using cellular communications technology, which may include, for example, laptop computers, Personal Digital Assistants (PDA), vehicles, and appliances. Such host devices may or may not comprise elements 101-103 and 105-108, as determined by the specific design requirements of the specific host device.

The universal radio module 104 can be consumer-pluggable into the host device 100, such that it may be removed by the consumer and placed into another host device. A wide range of techniques are available to implement a consumer-pluggable configuration, as will be appreciated by those of skill in industrial design. For example, SIM cards and cell phone batteries are typically configured in a consumer pluggable manner, where a consumer can easily remove or exchange the component from the host device 100. One advantage of embodiments with a consumer pluggable configuration is that the consumer may own, for example, just one universal radio module 104, while he or she owns many host devices 100. The universal radio module 104 may be removed from a cell phone and placed into another cell phone, an appropriately equipped automobile, appliance, or other appropriately configured host device 100.

In addition, from the operator's perspective, since the same universal radio module 104 can be used on any form factor that supports the proper interfaces once the universal radio module 104 is certified by the operator, this reduces the time required for host device 100 certification and thus increases the number of host devices available to the consumers. This increases the rate of penetration of the technology and further helps in lowering the cost of the product and service.

In general, a universal radio module 104 as contemplated herein can be plugged into any host device 100 requiring wide-area wireless access, so long as the host device 100 implements an appropriate supporting interface. In one specific embodiment, the universal radio module 104 may provide Radio Frequency (RF), Baseband, call process logic, and bus interface. The host device 100 contains software and drivers to provide multiplexing of voice, data, and control stream to and from the universal radio module interface. The host device 100 will also contain applications, user interfaces such as display, audio I/O, keypad, and so forth as applicable.

The universal radio module 104 may provide universal plug and play capability to any host device 100 so that the host device may access a cellular network. In this regard, the universal radio module 104 concept contemplates a logical separation of radio stack and call processing as may be provided by a universal radio module 104, from applications and user interface, which may be provided by a host device 100. As described further below, an interface construct is set forth for providing the control of the universal radio module 104 by the host device 100. The same interface construct may provide user plane, both voice and data, between the universal radio module 104 and the host device 100.

Figure 2:
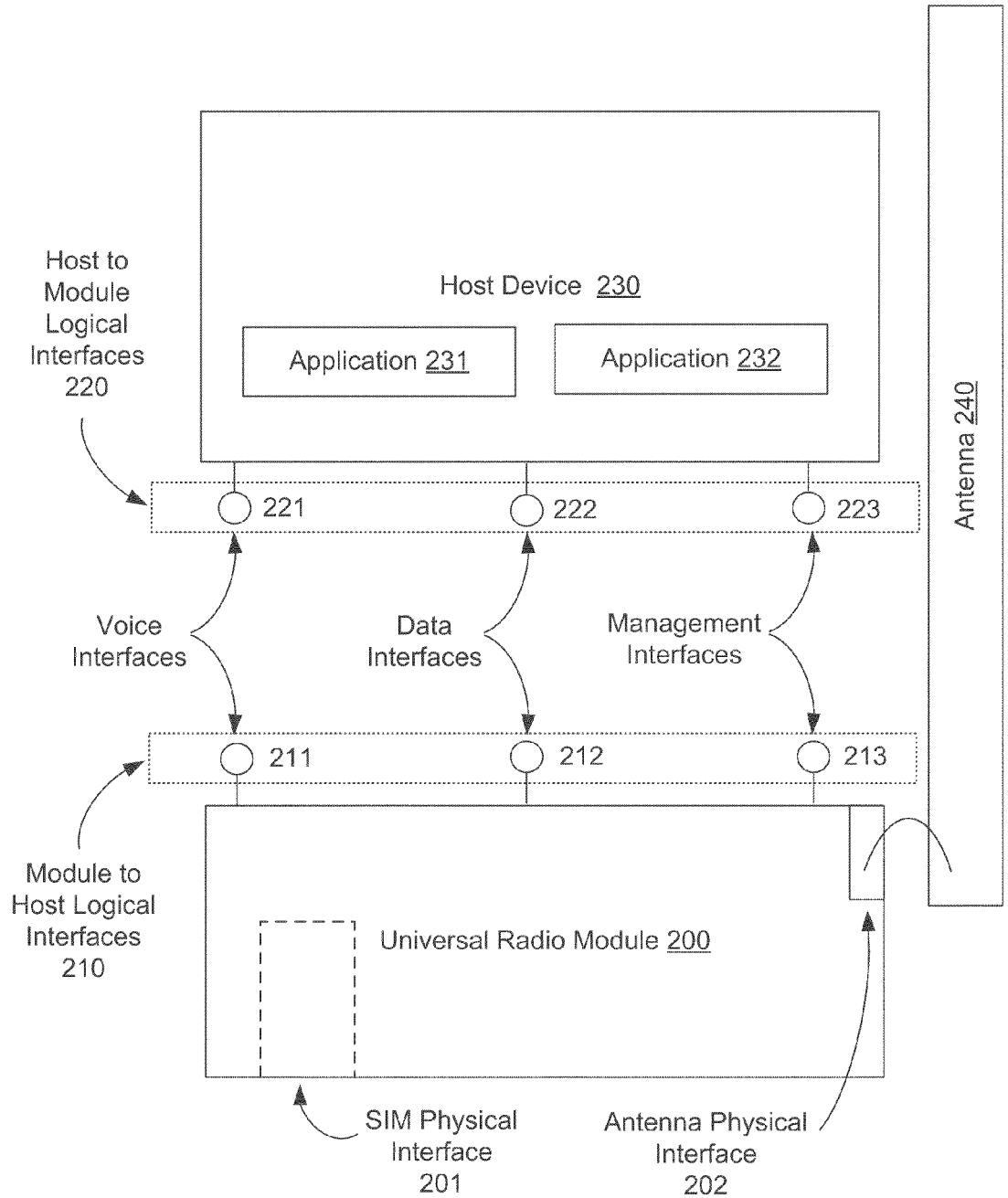
FIG. 2 illustrates a universal radio module 200 that may comprise three logical module-to-host interfaces 210, and a host device 230 which may comprise three logical host-to-module interfaces 220.

FIG. 2 illustrates various elements from FIG. 1 in greater detail. A universal radio module 200 may comprise three logical module-to-host interfaces 210 consisting of a voice interface 211, a data interface 212, and a management interface 213. The host device 230 may be equipped with three corresponding logical host-to-module interfaces 220 also consisting of a voice interface 221, a data interface 222, and a management interface 223. Antenna 240 may be incorporated into module 200 or host device 230. Module 200 may further comprise elements such as SIM physical interface 201, into which a SIM card may be inserted, and antenna physical interface 202 for controlling antenna 240.

Module 200 performs radio communications functions on behalf of host device 230. The term "radio communications" as used herein should be construed as communicating via a wireless electromagnetic signal that is typically in the radio band frequency. The module 200 converts information received from host device 200 via interfaces 210 into wirelessly transmittable signals, and causes an antenna 240 to transmit such signals. Conversely, module 200 converts incoming signals into information that may be transmitted to host device via interfaces 210.

Logical voice interfaces 211 and 221 send and receive voice information between module 200 and host device 230. Host device 230 comprises, for example, a microphone for receiving voice information when a user speaks. The microphone may translate the voice information associated with the sound waves of the user's voice into an electrical signal, and host 230 may conduct any manner of further processing of the voice information prior to passing the it through 221 to module 200. Module 200 receives the voice information through 211, and may conduct any manner of further processing in order to wirelessly transmit the voice information as a radio signal. The actual transmission may be carried out by antenna 240, which responds to electrical signals applied by module 200 at the antenna physical interface 202.

The above operations are conducted in reverse when incoming voice information is received at antenna 240 and carried to module 200 through antenna physical interface 202. Module 200 performs any manner of processing of the received voice information, then sends it to host device 230 via logical voice interface 211. Host device 230 receives the voice information via voice interface 221, and may perform its own additional processing prior to sending the information to a speaker to be translated to sound waves and heard by the user.

Similar operations occur over logical data interfaces 212 and 222. Logical data interfaces 212 and 222 send and receive data information between module 200 and host device 230. Host device 230 comprises, for example, applications 231, 232 such as gaming software, photo and video sharing software, text messaging, music player and purchase applications, web browsing software and the like which may require data transmission. The applications 231, 232 generate output data information, and host 230 may conduct any manner of further processing of the data information prior to passing the it through 222 to module 200. Module 200 receives the data information through 212, and may conduct any manner of further processing in order to wirelessly transmit the data information as a radio signal. Again, the actual transmission may be carried out by antenna 240, which responds to electrical signals applied by module 200 at the antenna physical interface 202.

The above operations are conducted in reverse when incoming data information is received at antenna 240 and carried to module 200 through antenna physical interface 202. Module 200 performs any manner of processing of the received data information, then sends it to host device 230 via logical data interface 212. Host device 230 receives the data information via data interface 222, and may perform its own additional processing prior to sending the information to the appropriate application 231, 232, which may ultimately output some displayed or sound information for consumption by the user.

Similar operations occur over logical management interfaces 213 and 223. Logical management interfaces 213 and 223 send and receive management and call control information between module 200 and host device 230. Host device 230 comprises, for example, appropriate hardware and software for a user to initiate or answer a voice call or other wireless communication sessions, such as a video streaming session or a data session for Internet browsing. Such initiation may require indication from a user that he or she wishes to start a session. Such management information may be processed by host 230 prior to passing it through 223 to module 200. Module 200 receives the call/session control information through 213, and may conduct any manner of further processing such as supplying a device 230 and/or module 200 identifier (ID), network configuration settings, and other management and control information that must be communicated to an appropriate network. Module 200 may wirelessly transmit the management information as a radio signal.

In the reverse scenario, received management information such as an incoming call request or other wireless broadcast transmission conveying management or call control information may be processed by module 200. Appropriate management information may then be sent to host device 230 via logical management interface 213. Host device 230 receives the management information via management interface 223, and may perform its own additional processing prior storing it or otherwise using it to appropriately configure and provision the host device 230, and/or indicating an incoming call to a user or the like.

Module 200 may perform additional functions beyond radio communications. In one embodiment, the module 200 is an all-in-one radio access unit completed with RF, baseband, and call processing logic to handle layer 1 to 3 functions of a mobile station specified in any cellular standards. Implementations of such functionality are generally understood in the art and it will be appreciated that they can be imported to the context discussed herein. Module 200 may perform all necessary network registration upfront and indicate network availability to the host device 230 via the logical management interface 213. The host device 230 may initiate call setup, both for data and/or for voice, as necessary. Once a call is setup, data or voice information, which may be Pulse Code Modulation (PCM) encoded, can flow through the logical interfaces 220 and 210.

The interfaces 220 and 210 can be considered as Service Access Points (SAP) for module 200 to provide service access to host device 230. As such, interfaces 211 and 221 may be collectively referred to as a V-SAP, while interfaces 212 and 222 may be referred to as a D-SAP, and 213 and 223 as an M-SAP. M-SAP (213/223) may provide the service access point for the host device 230 to send and receive management messages. The D-SAP (212/222) and V-SAP (211/221) may provide the access points for host device 230 to send and receive data and voice streams, respectively. In the illustrated embodiment, all the SAPs (interfaces) are bi-directional.

Figure 3:
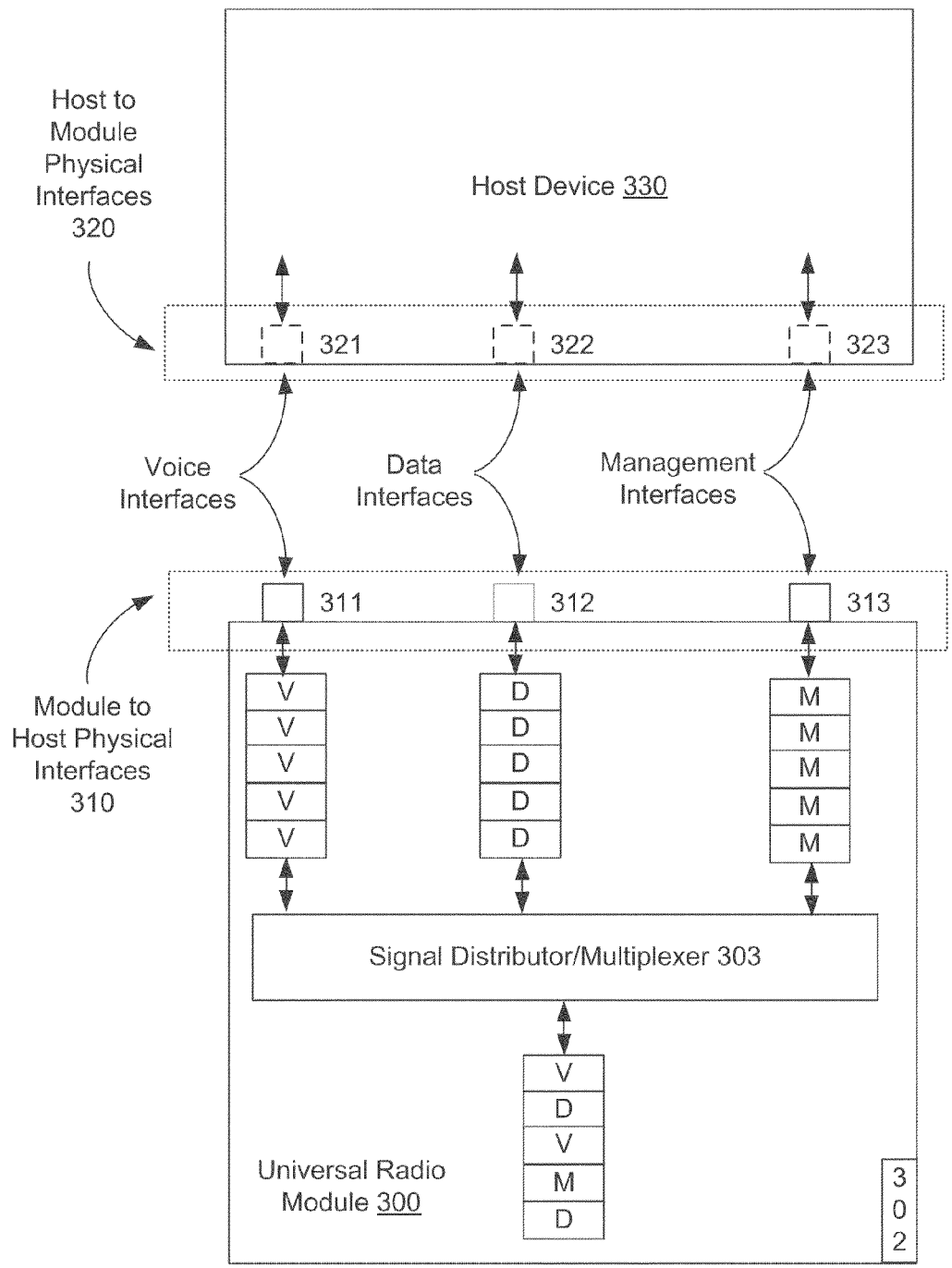
FIG. 3 illustrates a module 300 with three module-to-host physical interfaces 311, 312, 313, corresponding to three host-to-module physical interfaces 321, 322, 323.
Figure 4:
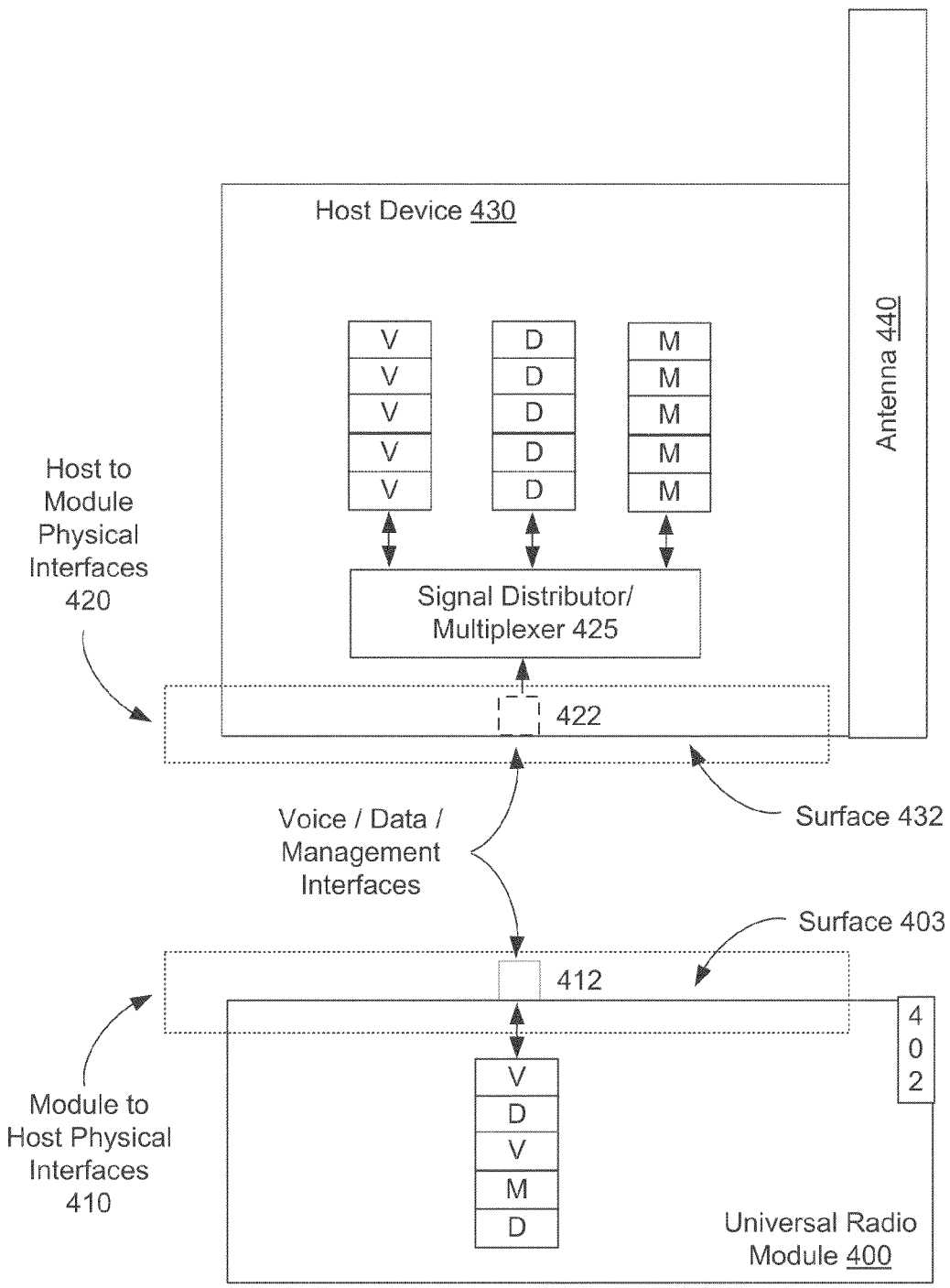
FIG. 4 illustrates an embodiment in which logical interfaces for voice, data, and management are implemented using a single module interface 412.

FIGS. 3 and 4 illustrate exemplary configurations for physical interfaces corresponding to the logical interfaces 210, 220 of FIG. 2. As will be appreciated from an investigation of the Figures, differing physical interface configurations will require differing signal distribution and multiplexing functionality to appropriately pipe information between host device and module.

FIG. 3 illustrates a module 300 with three module-to-host physical interfaces 311, 312, 313, corresponding to three host-to-module physical interfaces 321, 322, 323. Each physical interface corresponds to one logical interface. Physical interface 311 transmits and receives voice information, physical interface 312 transmits and receives data information, and physical interface 313 transmits and receives management information. This configuration allows information on the host 330 side to flow directly to the appropriate interface 321, 322, or 323. On the module 300 side, however, information is ultimately transferred via the antenna 302. Outgoing voice (V), data (D) and Management (M) information needs to be appropriately multiplexed for radio transmission. Conversely, incoming radio transmissions must be distributed (de-multiplexed) to the appropriate physical interface. Appropriate functionality 303 can reside in the module 300 for multiplexing and signal distribution. Such functionality is generally understood in the art and it will be appreciated that it may be utilized in the context of the module 300.

FIG. 4 illustrates another embodiment, where logical interfaces for voice, data, and management are implemented using a single module interface 412. Here, module 400 may deliver multiplexed information across interface 412. The information may be distributed by appropriate functionality on the host, such as signal distributor/multiplexer 425. Conversely, the host can multiplex information prior to sending it across physical interface 422 to module 400. In light of the embodiments illustrated here, it should be appreciated that any physical interface structure is acceptable for implementing the three logical interfaces provided here.

The terms "interface" and "logical interface" are used interchangeably, and should be distinguished from the term "physical interface." A physical interface implies some physical structure for transmitting electrical signals, such as an electrical contact point. Thus, three physical interfaces should be understood as requiring at least three individual physical structures. The invention may be used with any of a wide variety of known physical interfaces, including but not limited to a mini PCI physical interface, an Express Card (PCMCIA) physical interface, or a minicard physical interface, and PCI Express Wireless Form Factor (WFF). The three logical interfaces 211, 212, and 213 of FIG. 2 may be implemented across any such exemplary physical interfaces as will be appreciated by those of skill in the art.

In one embodiment, the three logical interfaces 210 of FIG. 2 may be implemented on a physical interface 412 that is arranged on a single surface 403 of the module 240. For example, if module 400 is constructed as a six-sided cube, a physical interface 402 may also be on the same surface 403.

As with the module 400, the three host-to-module interfaces 420 may be arranged on a single surface 432 of the host 430. For example, if interfaces 420 are incorporated into a host device 430 circuit board with a front side and a back side, then interfaces 420 may all be arranged along a first side of the circuit board. In embodiments where antenna 440 is provided by the host device 430, antenna 440 may also be arranged in such a way as to interface with the antenna physical interface 402 which is along module surface 403. Antenna physical interface 402 may be accompanied by some functionality that can be considered a logical interface. Nonetheless, for the purposes of this document, such a logical interface is not considered a logical module-to-host interface because antenna 440 is considered as separate from the host (even though it may be physically housed by the host 430). Antenna 440 is not directly connected to the host 430 circuit board.

The universal radio module described herein has the potential of providing cellular communications functionality to a wide variety of devices that were previously unable to wirelessly communicate. It may also drive down the cost of hardware, cellular service, and qualification. Imagine a world where one can plug a universal radio module into an automobile to allow voice communication, navigation, web browsing, auto payment for tolls, parking, and so on. Or one can plug the module into a PDA/handset shell for mobile communication at one time, and then plug the same module into a laptop while at home or at the airport for browsing.

Another problem addressed by embodiments of the universal radio module is that of users who suffer from increasing latency in network scanning due to a number of bands to scan. With the universal radio module, vendors can design modules specific to certain regions or countries. Consumers may also carry multiple universal radio modules for one specific host device which the user prefers. Not only can cost be reduced for both modules and host devices, but user experience can be improved through shorter scanning times.

Figure 5:
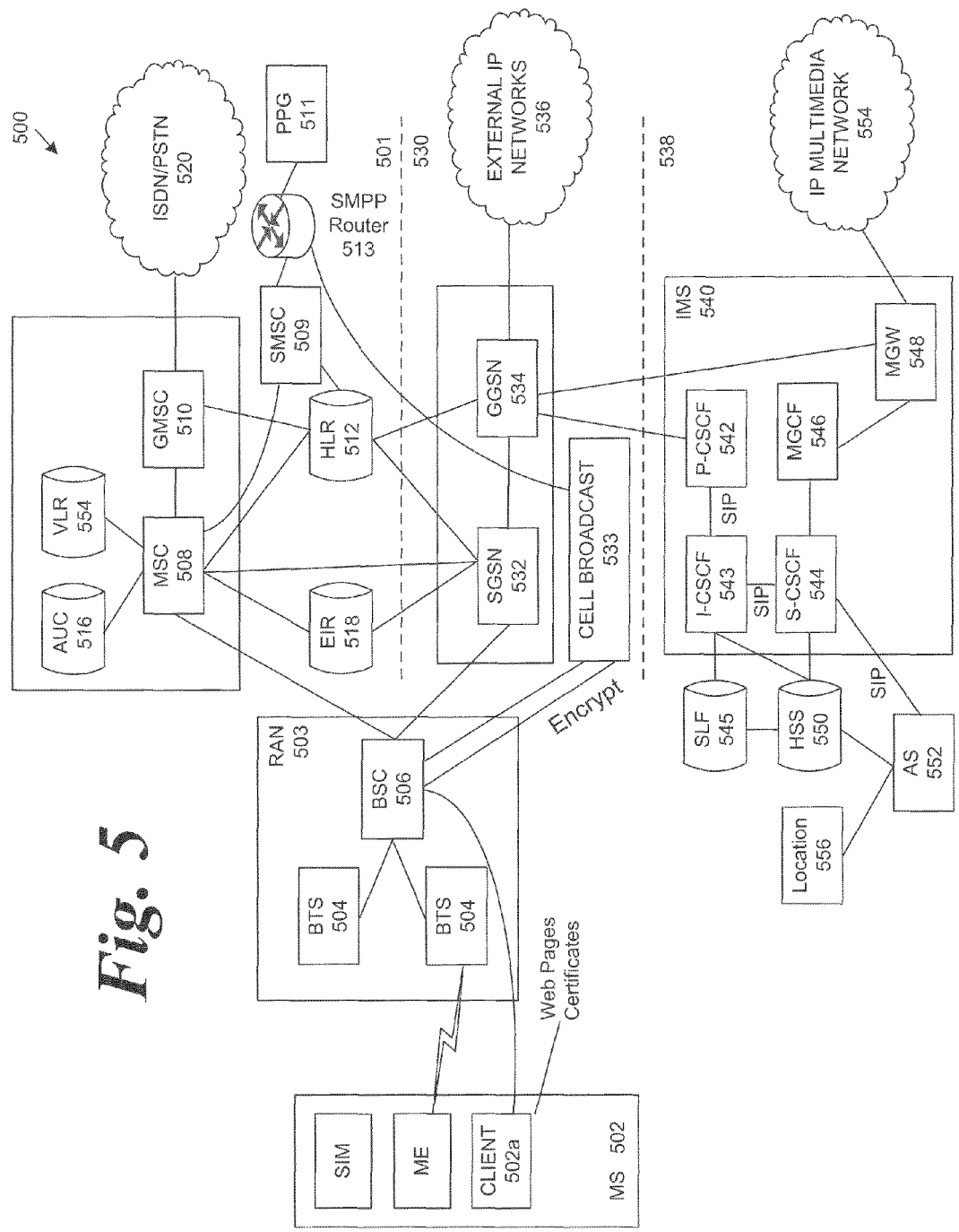
FIG. 5 illustrates a general operating environment of a host device and universal radio module provided herein.

FIG. 5 is directed to the general operating environment of a host device and universal radio module provided herein. Terms such as "cellular communications" should be generally understood by those of skill in the art, and should be distinguished from other forms of wireless communications such as those based on the 802.11 protocols. FIG. 5 generally illustrates a cellular communications operating environment. The invention and the term cellular communications are not limited to any specific aspects of FIG. 5, but should rather be understood to operate in and refer to (respectively) operating environments such as the general type of operating environment illustrated in FIG. 5.

The global system for mobile communication ("GSM") is one of the most widely utilized cellular communications systems in today's fast growing telecommunication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High-Speed Downlink Packet Access ("HSDPA"), High-Speed Uplink Packet Access ("HSUPA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the invention may be applied independently of the method of data transport, and does not depend on any particular network architecture, or underlying protocols.

FIG. 5 shows another exemplary block diagram view of a GSM/GPRS/IP multimedia network architecture 500 in which the apparatus and methods for service delivery based on priority level and/or revenue impact of the present invention may be incorporated. As illustrated, architecture 500 of FIG. 5 includes a GSM core network 501, a GPRS network 530 and an IP multimedia network 538. The GSM core network 501 includes a Mobile Station (MS) 502, at least one Base Transceiver Station (BTS) 504 and a Base Station Controller (BSC) 506. The MS 502 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 504 is physical equipment, such as a radio tower, that enables a radio interface to communicate with the MS. Each BTS may serve more than one MS. The BSC 506 manages radio resources, including the BTS. The BSC may be connected to several BTSs. The BSC and BTS components, in combination, are generally referred to as a base station (BSS) or radio access network (RAN) 503.

The GSM core network 501 also includes a Mobile Switching Center (MSC) 508, a Gateway Mobile Switching Center (GMSC) 510, a Home Location Register (HLR) 512, Visitor Location Register (VLR) 514, an Authentication Center (AuC) 518, and an Equipment Identity Register (EIR) 516. The MSC 508 performs a switching function for the network.

The MSC also performs other functions, such as registration, authentication, location updating, handovers, and call routing. The GMSC 510 provides a gateway between the GSM network and other networks, such as an Integrated Services Digital Network (ISDN) or Public Switched Telephone Networks (PSTNs) 520. In other words, the GMSC 510 provides interconnecting functionality with external networks.

The HLR 512 is a database that contains administrative information regarding each subscriber registered in a corresponding GSM network. The HLR 512 also contains the current location of each MS. The VLR 514 is a database that contains selected administrative information from the HLR 512. The VLR contains information necessary for call control and provision of subscribed services for each MS currently located in a geographical area controlled by the VLR. The HLR 512 and the VLR 514, together with the MSC 508, provide the call routing and roaming capabilities of GSM. The AuC 516 provides the parameters needed for authentication and encryption functions. Such parameters allow verification of a subscriber's identity. The EIR 518 stores security-sensitive information about the mobile equipment.

A Short Message Service Center (SMSC) 509 allows one-to-one Short Message Service (SMS) messages to be sent to/from the MS 502. A Push Proxy Gateway (PPG) 511 is used to "push" (i.e., send without a synchronous request) content to the MS 502. The PPG 511 acts as a proxy between wired and wireless networks to facilitate pushing of data to the MS 502. A Short Message Peer to Peer (SMPP) protocol router 513 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 502 sends a location update including its current location information to the MSC/VLR, via the BTS 504 and the BSC 506. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 530 is logically implemented on the GSM core network architecture by introducing two packet-switching network nodes, a serving GPRS support node (SGSN) 532, a cell broadcast and a Gateway GPRS support node (GGSN) 534. The SGSN 532 is at the same hierarchical level as the MSC 508 in the GSM network. The SGSN controls the connection between the GPRS network and the MS 502. The SGSN also keeps track of individual MS's locations and security functions and access controls.

A Cell Broadcast Center (CBC) 533 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 534 provides a gateway between the GPRS network and a public packet network (PDN) or other IP networks 536. That is, the GGSN provides interconnecting functionality with external networks, and sets up a logical link to the MS through the SGSN. When packet-switched data leaves the GPRS network, it is transferred to an external TCP-IP network 536, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 530 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 538 was introduced with 3GPP Release 5, and includes an IP multimedia subsystem (IMS) 540 to provide rich multimedia services to end users. A representative set of the network entities within the IMS 540 are a call/session control function (CSCF), a media gateway control function (MGCF) 546, a media gateway (MGW) 548, and a master subscriber database, called a home subscriber server (HSS) 550. The HSS 550 may be common to the GSM network 501, the GPRS network 530 as well as the IP multimedia network 538.

The IP multimedia system 540 is built around the call/session control function, of which there are three types: an interrogating CSCF (I-CSCF) 543, a proxy CSCF (P-CSCF) 542, and a serving CSCF (S-CSCF) 544. The P-CSCF 542 is the MS's first point of contact with the IMS 540. The P-CSCF 542 forwards session initiation protocol (SIP) messages received from the MS to an SIP server in a home network (and vice versa) of the MS. The P-CSCF 542 may also modify an outgoing request according to a set of rules defined by the network operator (for example, address analysis and potential modification).

The I-CSCF 543 forms an entrance to a home network and hides the inner topology of the home network from other networks and provides flexibility for selecting an S-CSCF. The I-CSCF 543 may contact a subscriber location function (SLF) 545 to determine which HSS 550 to use for the particular subscriber, if multiple HSS's 550 are present. The S-CSCF 544 performs the session control services for the MS 502. This includes routing originating sessions to external networks and routing terminating sessions to visited networks. The S-CSCF 544 also decides whether an application server (AS) 552 is required to receive information on an incoming SIP session request to ensure appropriate service handling. This decision is based on information received from the HSS 550 (or other sources, such as an application server 552). The AS 552 also communicates to a location server 556 (e.g., a Gateway Mobile Location Center (GMLC)) that provides a position (e.g., latitude/longitude coordinates) of the MS 502.

The HSS 550 contains a subscriber profile and keeps track of which core network node is currently handling the subscriber. It also supports subscriber authentication and authorization functions (AAA). In networks with more than one HSS 550, a subscriber location function provides information on the HSS 550 that contains the profile of a given subscriber.

The MGCF 546 provides interworking functionality between SIP session control signaling from the IMS 540 and ISUP/BICC call control signaling from the external GSTN networks (not shown). It also controls the media gateway (MGW) 548 that provides user-plane interworking functionality (e.g., converting between AMR- and PCM-coded voice). The MGW 548 also communicates with other IP multimedia networks 554.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While the present invention has been described in connection with the preferred embodiments of the various Figures, it is to be understood that other similar embodiments may be used or modifications and additions may be made to the described embodiment for performing the same function of the present invention without deviating therefrom. For example, one skilled in the art will recognize that the present invention as described in the present application may apply to any number of devices connected via a communications network and interacting across the network. Therefore, the present invention should not be limited to any single embodiment, but rather should be construed in breadth and scope in accordance with the appended claims.

What is claimed:

1. A communications module for performing radio communications functions in a cellular communications device, the communications module comprising:
 a plurality of logical module-to-host interfaces comprising:
  a module logical voice interface configured to communicatively connect to a cellular communications device logical voice interface;
  a module logical data interface configured to communicatively connect to a cellular communications device logical data interface; and
  a module logical management interface configured to communicatively connect to a cellular communications device logical management interface;
 a module antenna physical interface configured to physically connect to a cellular communications device antenna;
 a module communications physical interface configured to transmit a multiplexed output signal to the cellular communications device;
 a module multiplexer-demultiplexer configured to:
  demultiplex a signal received on the module antenna physical interface into a voice input signal, a data input signal, and a management input signal; and
  provide the voice input signal to the module logical voice interface, the data input signal to the module logical data interface, and the management input signal to the module logical management interface; and
 the module multiplexer-demultiplexer further configured to:
  multiplex a voice output signal from the module logical voice interface, a data output signal from the module logical data interface, and a management output signal from the module logical management interface; and
  provide the multiplexed output signal to the module communications physical interface.

2. The communications module of claim 1, wherein the module communications physical interface is implemented on a mini PCI physical interface.

3. The communications module of claim 1, wherein the module communications physical interface is implemented on a PCI Express physical interface.

4. The communications module of claim 1, wherein the module communications physical interface is implemented on a PCMCIA ExpressCard physical interface.

5. The communications module of claim 1, wherein the module communications physical interface is implemented on a PCI Express Wireless Form Factor (WFF) physical interface.

6. The communications module of claim 1, further comprising a Subscriber Identity Module (SIM) physical interface.

7. The communications module of claim 1, wherein the module antenna physical interface is on a same surface of the communications module as a surface comprising the module communications physical interface.

8. The communications module of claim 1, wherein the communications module is consumer-pluggable into a host device.

9. The communications module of claim 1, wherein the communications module is configured to implement a third generation (3G) wireless protocol.

10. The communications module of claim 1, wherein the communications module performs at least one of baseband processing functions and call processing functions.

11. A communications module for performing radio communications functions in a cellular communications device, comprising:
 three logical module-to-host interfaces comprising:
  a module logical voice interface configured to communicatively connect to a cellular communications device logical voice interface;
  a module logical data interface configured to communicatively connect to a cellular communications device logical data interface; and
  a module logical management interface configured to communicatively connect to a cellular communications device logical management interface;
 a module antenna physical interface configured to physically connect to a cellular communications device antenna;
 a module communications physical interface configured to receive a multiplexed input signal from the cellular communications device;
 a module multiplexer-demultiplexer configured to demultiplex the multiplexed input signal received on the module communications physical interface into a voice input signal, a data input signal, and a management input signal and provide the voice input signal to the module logical voice interface, the data input signal to the module logical data interface, and the management input signal to the module logical management interface; and the module multiplexer-demultiplexer further configured to multiplex a voice output signal from the module logical voice interface, a data output signal from the module logical data interface, and a management output signal from the module logical management interface and provide the multiplexed output signal to the module antenna physical interface.

12. The communications module of claim 11, wherein the module communications physical interface is implemented on a mini PCI physical interface.

13. The communications module of claim 11, wherein the module communications physical interface is implemented on a PCI Express physical interface.

14. The communications module of claim 11, wherein the module communications physical interface is implemented on a PCMCIA ExpressCard physical interface.

15. The communications module of claim 11, wherein the module communications physical interface is implemented on a PCI Express Wireless Form Factor (WFF) physical interface.

16. The communications module of claim 11, further comprising a Subscriber Identity Module (SIM) physical interface.

17. The communications module of claim 11, wherein the module antenna physical interface is on a same surface of the communications module as a surface comprising the module communications physical interface.

18. The communications module of claim 11, wherein the communications module is consumer-pluggable into a host device.

19. The communications module of claim 11, wherein the communications module is configured to implement a third generation (3G) wireless protocol.

20. The communications module of claim 11, wherein the communications module performs at least one of baseband processing functions and call processing functions.

* * * * *